Figure 1:
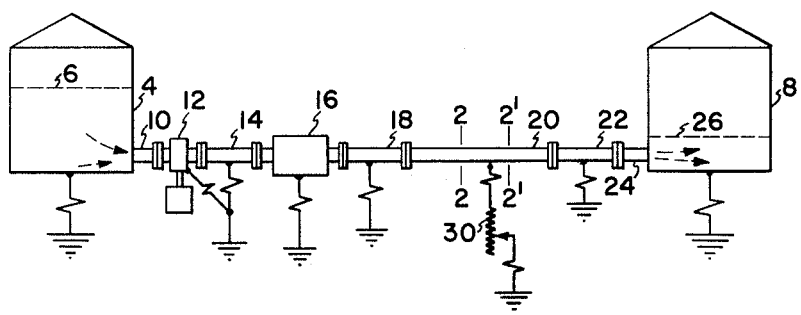

Dec. 8, 1964  J. C. MUNDAY  3,160,785
PROCESS OF REDUCING ELECTROSTATIC CHARGES IN FLUID FLOW LINES
Filed Jan. 26, 1961

John C. Munday   Inventor

By  Richard L. Cannaday

Patent Attorney

3,160,785
PROCESS OF REDUCING ELECTROSTATIC CHARGES IN FLUID FLOW LINES
John C. Munday, Cranford, N.J., assignor to Esso Research and Engineering Company, a corporation of Delaware
Filed Jan. 26, 1961, Ser. No. 85,059
2 Claims. (Cl. 317—2)

The present invention relates to the reduction of electrostatic charges in liquids. More particularly, it relates to practical methods of reducing electrostatic charges produced in the transportation and handling of flammable liquids, so as to minimize the danger of explosions and fires.

This application is a continuation-in-part of an application Serial No. 858,841 filed in the United States Patent Office on December 11, 1959, and now abandoned.

In the recent past, many explosions attributed to static electricity have occurred during the handling of flammable liquids particularly petroleum products. These explosions have taken place in tank trucks, aircraft fuel tanks, tanker compartments, blending tanks, and storage tanks during operations such as the filling of tanks, blending of liquids, water displacement of pipelines, gauging, loading of tankers, and refueling of jet fighters. The products involved in these explosions include turbo jet fuel, kerosene, gasoline, heating oil, and hot asphalt. Recently, a larger proportion of accidents has been caused by hydrocarbon fuels which form flammable vapor-air mixtures at ambient temperatures, such as JP-4 jet fuels. The danger of explosions from static electricity is not limited to hydrocarbons, however. Static electricity is produced in large amounts by other flammable liquids such as oxygen- and sulfur-containing solvents.

Static electricity is produced when a liquid moves past the surface of a solid or another liquid. For example, liquids become charged by static electricity when they are pumped through pipes or filters, or agitated in tanks, or when they are sprayed into another liquid, or when a solid or liquid material rises or settles through them. The phenomenon has been known for more than 100 years, Michael Faraday being an early researcher in the field (Faraday's Experimental Researches in Electricity, London, vol. II, 1844). The mechanism whereby static electricity is produced by a liquid is believed to involve the adsorption of ions of one polarity (e.g. positive ions) on the surface, with the ions of opposite polarity (e.g. negative ions) remaining in the liquid and moving downstream with it. The flow of ions with the liquid stream constitutes an electric current, known as "streaming current," and this current causes a difference in electrostatic potential, known as "streaming potential." The overall process involving the adsorption of ions of one polarity and the transport of ions of the other polarity, is called "charge separation."

Extremely high potentials are produced by the transport of very small quantities of ions. For example, if the ions have a molecular weight of 100, only $10^{-9}$ mole of ions need be transported into a spherical tank of about 10 meters radius in order to raise the potential of the tank to about 100,000 volts.

The magnitude of the streaming current depends on the concentration of the ions in the liquid. Very pure hydrocarbons produce relatively small streaming currents because ions are so scarce that little charge separation can take place, but impure hydrocarbons containing high concentrations of ions produce large streaming currents. For example, using electrical conductivity as a measure of ion concentration, a hydrocarbon having a conductivity of about $1 \times 10^{-14}$ hmo/cm. may give a streaming current of about $1 \times 10^{-10}$ amperes, but if the conductivity is $1 \times 10^{-12}$ mho/cm., the current may be more than $1 \times 10^{-7}$ amperes. On the other hand, at a still higher conductivity such as $1 \times 10^{-10}$ mho/cm. the streaming current may be less, for the reason that now the conductivity is so high that the counter-flow of current upstream becomes appreciable. The driving force for this counter-current is, of course, the streaming potential.

It should not be assumed that streaming current can be correlated with electrical conductivity. Both the nature of the ionic constituents and the system itself are involved. It is true that as the conductivity of a liquid is increased by the addition of a particular ionizing constituent, a smooth conductivity-current curve may be obtained. However, with another ionizing constituent, a different curve, even having polarity reversals, may be obtained. Also, in one system the streaming current may fall off to zero when the conductivity is increased to $1 \times 10^{-12}$ mho/cm., while with other systems the streaming current will be very high even at a conductivity of $1 \times 10^{-7}$ mho/cm. Systems wherein the liquid stream is discontinuous, such as in the overshot filling of tanks or wherever sprays are formed, produce high streaming currents even when the liquid conductivity is high. The reason for this is believed to be that there is no continuous path for the electricity back to the charge-separating surface.

Two other important factors in the production of static electricity are flowrate and surface area. Streaming current increases with flowrate, the factor being the linear flowrate to the power 1.75, and for this reason flowrate should be kept low. A maximum flowrate of 3 ft./sec. has been recommended when handling hazardous JP-4 jet fuel. Streaming current also increases with surface area. Filtration, an operation which depends on large surface area, produces very high currents especially if it is carried out at relatively high flow rates.

Many methods of reducing the hazard from static electricity have been proposed. Grounding of tanks and other equipment is partially effective. The charge on the surface of the tank is safely drained off to ground, but it takes time for the charge to relax, and before this can take place a hazardous spark may occur in the tank. The lower the conductivity of a liquid, the longer relaxation time is required. The relaxation half-time $T_{1/2}$, the time in seconds required for one-half the charge to be drained off, depends on the electrical conductivity ($\sigma$ in mho/cm.) and dielectric constant, E (ca. 2 for hydrocarbons) of the liquid according to the formula $$T_{1/2} = 0.69 \, EE_0/\sigma$$

where $E_0$ is a constant $8.84 \times 10^{-14}$ farad/cm. (the "dielectric constant" of empty space). Thus, the half-time for a $10^{-15}$ conductivity hydrocarbon is about 130 seconds and for a $10^{-12}$ conductivity hydrocarbon, it is about 0.13 second. It can be seen that, especially for low conductivity liquids, a hazardous condition can exist for an appreciable period of time.

A grounded "relaxation" tank preceding a receiving tank has been proposed by several workers in the field. This is effective in removing the charge in the liquid at that point in the system, but does not take care of any charge generated subsequently in piping, valves, or tank inlets.

Radiation to increase the conductivity in the vapor space above a liquid has been studied. However, since increasing the vapor conductivity may increase the possibility of a spark, this method cannot be recommended.

Magnetic and electrostatic fields to drive the ions in a stream toward neutralizing electrodes have been tested, with indifferent results. Apparently, the fields that would be required for these methods to be successful are much too large to be practicable.

The addition of additives which increase the conductivity of the liquid and decrease its relaxation time has shown considerable promise. Once a liquid is in a tank, in bulk form, there is no doubt that a higher conductivity liquid will relax, or lose its charge to a grounded tank wall, faster than a lower conductivity liquid. On the other hand, since the higher conductivity liquid contains a greater concentration of ions, it will produce a higher streaming current. If there is no opportunity for this charge to relax prior to entering the tank, the net result of the addition of an additive may be a "pro-static" effect. This effect will be especially hazardous if spraying and misting of charged liquid occurs in the tank.

According to the present invention, liquids that are charged with static electricity are neutralized by contact with a grounded, electrically conductive pointed electrode. For example, a common pin or needle, connected electrically to ground and having its tip in contact with a liquid charged to many thousands of volts, will neutralize the charge in a very short time, generally in a matter of seconds and often in a fraction of a second.

In carrying out the invention, the pointed electrode is insulated electrically, except for the connection to ground. Where charged liquids are present in pipes, which is often the case in liquid handling systems, the insulation can consist of a section of insulating pipe; for example, glass or a low conductivity plastic such as polyethylene or polytetrafluoroethylene (Teflon), polyamide, polymethacrylate (Lucite) or polystyrene. Such insulation appears to be necessary for the proper functioning of the pointed electrode.

It is also necessary, if the electrode is to be very efficient in neutralizing the charged liquid, that the pointed electrode be spaced apart from other electrically conducting materials, particularly grounded metals. The required spacing is not very great, in many cases being a matter of inches, but it is quite desirable. For example, a grounded pointed electrode in a grounded metal pipe through which statically charged liquid is flowing gives practically no more neutralization than the pipe itself, and furthermore, an electrode in a glass pipe covered with a grounded metal sheath is an inefficient neutralizer.

The grounded, pointed electrode is far more efficient than a grounded vessel or pipe, despite the fact that the latter are actually the equivalent of Faraday ice pails which immediately transfer all charges to their outside surfaces. Neutralization in a grounded vessel or pipe follows the "relaxation" formula discussed earlier, but neutralization with a pointed electrode appears to have an entirely different mechanism. The so-called "pin effect" of the pointed electrodes is a most effective method of neutralizing charged liquids. As will be shown in the examples, the method is operable on either positively charged liquids or negatively charged liquids. In either case, neutralization can be substantially complete or it can undershoot or overshoot. Generally, substantially neutral or over-neutralized liquids can be obtained, and over-neutralization can be controlled by varying the position of the electrode point, by varying the capacitance between the electrode point and other conductive objects, and/or by varying the resistance between the electrode and ground.

The composition of the electrode does not appear to be particularly critical. As will be shown in the examples, many different specific metals and alloys have given good results.

The invention is useful for neutralizing static charges in flammable liquids having a wide range of electrical conductivities, from about $1 \times 10^{-15}$ to about $1 \times 10^{-6}$ mho/cm. It is especially useful with liquids having conductivities from about $1 \times 10^{-14}$ to $1 \times 10^{-10}$ mho/cm., since liquids in the low part of this range have long relaxation times and neutralize slowly by conventional relaxation methods, and liquids in the high part of this range often become charged by static electricity to extremely high levels. Furthermore, in this range are generally found the commercially available gasolines, jet fuels, kerosenes, and heating oils, per se, and additive blends thereof. Besides those already mentioned, liquids with which the present invention is useful include alcohols such as methanol, ethanol, and isopropanol; ketones such as acetone and methyl ethyl ketone; esters such as ethyl acetate and methyl methacrylate; hydrocarbons such as hexane, cyclohexane, diisobutylene, tri-propylene, benzene, toluene and xylenes; and various other liquids including carbon disulfide.

Figure 2:
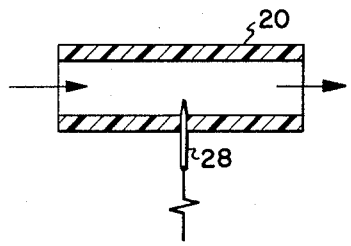

The nature and substance of this invention will be more clearly understood by referring to the accompanying drawing in which:

FIG. 1 represents a generalized pumping or transfer system for flammable liquids which is provided with means including a conduit section of electrically non-conductive material according to this invention for the control of electrostatic charges, and FIG. 2 represents a view in longitudinal section through the electrically non-conductive conduit section of FIG. 1 between transverse sections 2—2 and 2'—2' thereof particularly showing the pin electrode provided in this conduit section according to the present invention.

Referring now to the drawing in detail, a storage tank 4 is filled to a level 6 with a flammable liquid. This storage tank is connected to a receiving tank 8 by means of outlet fitting 10, pump 12, conduit section 14, filter 16, conduit section 18, conduit section 20, conduit section 22, and inlet fitting 24. The receiving tank is filled to a level 26. Pump 12 and filter 16 have metal or electrically conductive casings. Likewise tanks 4 and 8 and their outlet and inlet fittings 10 and 24 are made of metal. Of the several conduit sections, however, at least one of them downstream of the filter, section 20 as illustrated, is fabricated of an electrically non-conductive material such as one of the plastics mentioned hereinbefore. Extending radially inwardly through the wall of this conduit section is a pin electrode 28. This electrode is in electrically wired connection with ground through resistor 30. Other components of the pumping system such as the tanks, pump, filter and electrically conductive sections of conduit are grounded as shown.

The invention is illustrated further by the following examples, but the invention is not intended to be limited thereto.

EXAMPLE I

Heating oil of ASTM No. 2 grade having a conductivity of about $8 \times 10^{-13}$ mho/cm. was pumped through at 1" I.D. stainless steel pipe at the rate of 3 g.m.p., the pipe containing 2 grams of glass wool to serve as a filtering medium. After passing through the filter, the oil was passed through a ½" x 24" polyethylene pipe and into a 13-gallon receiving tank. The streaming current into the tank was $6.5 \times 10^{-7}$ amperes. In one second this current is sufficient to raise the potential of the tank to 13,000 volts, which will give a spark in air almost 1 cm. in length, and in air just over a liquid hydrocarbon several times as long. The energy contained in the spark is $J=CE^2=8$ millijoules; this is 40 times the energy required to ignite air-hydrocarbon vapor.

Two types of electrodes were tested for neutralizing the statically charged oil stream. One of these was a common nickel plated brass pin which was pushed through the wall of the polyethylene pipe, the pin tip being at the centerline of the pipe in contact with the heating oil flowing through the pipe. The other electrode was ½" x ⅝" I.D. polished brass pipe, having 1 sq. in. of inside surface exposed to the oil stream. Both the pin electrode and the pipe electrode were tested while situated four inches downstream of the filter. The filter and the electrodes were maintained at substantially ground potential by electrically connecting them to the ground, while the streaming current going into the receiving tank was measured with a micro-microammeter between the receiving tank and ground. The following results were obtained:

*Table I*

| Electrode: | Tank current amperes (multiplied by $10^7$) |
|---|---|
| None | +6.5 |
| Pipe | +5.1 |
| Pin | −2.5 |

It can be seen that the pin electrode was far more effective than the pipe electrode, in spite of the fact that the surface area of the pipe (about 1 sq. in.) was many times that of the pin tip.

EXAMPLE II

The extent of neutralization depends to some extent on the location of the electrode point. This is shown by the following data obtained with the equipment and oil described in Example I:

*Table II*

| Electrode: | Tank current amperes (multiplied by $10^7$) |
|---|---|
| None | +6.5 |
| Pin tip at pipe center | −2.5 |
| Pin tip close to opposite wall | +2.6 |
| Pin tip 2 mm. from opposite wall | 0 |

In other systems the position of the electrode point for maximum static reduction or for exact neutralization may vary somewhat with factors such as pipe size, flow rate, and flow pattern in the pipe, but the best position in any particular system can easily be determined by varying the electrode location.

EXAMPLE III

The extent of neutralization also varies with the position of the grounded pointed electrode along the length of the insulating pipe. This is shown by the data reported in section A of Table III, which were obtained using a heating oil, and the equipment and the conditions described in Examples I and II, and by the data reported in section B which were obtained with JP-4 jet fuel pumped at 4.5 g.p.m. through a glass wool filter and a 1" I.D. x 18" glass pipe into a 13-gallon receiving tank, the neutralizing electrode in this case being a pointed stainless steel wier which was moved lengthwise in the glass pipe at the centerline:

*Table III*

| Electrode position, inches from filter: | Tank current amperes (multiplied by $10^7$) |
|---|---|
| A. No electrode | +0.8 |
| 3 inches | −0.2 |
| 5 inches | −0.4 |
| B. No electrode | −0.5 |
| 2 inches | −0.35 |
| 4 inches | −0.25 |
| 6 inches | 0 |
| 8 inches | +0.2 |
| 10 inches | +0.35 |
| 12 inches | +0.30 |
| 14 inches | −0.10 |

It will be noted that there was a decrease in effectiveness as the grounded pointed electrode approached either the filter or the tank, both of which were at substantially ground potential.

EXAMPLE IV

In an experiment carried out in the equipment described in Example I, the neutralizing effect of one grounded pin and of two grounded pins whose tips were opposed 3 mm. apart in the oil stream was determined. The results, given in section A of Table IV, show that the two grounded pin electrodes with their tips in close proximity gave less neutralization than a single electrode.

In another experiment, wherein the glass wool filter of Example I was replaced by a segment of a commercial aviation fuel filter, a grounded pin electrode was studied at various locations: inside the grounded metal filter case, in the metal filter exit pipe ½" from the end, in the polyethylene pipe ¼" downstream of the metal filter exit pipe, and 2¼" downstream of the metal exit pipe, with the pin tip pointing downstream in each case. The data, given in Table IV–B, show that little or no static charge neutralization was obtained with the pin electrode in the grounded filter case, but that neutralization increased as the pin was moved downstream and out of the metal pipe, and was 97% complete with the pin 2¼" downstream of the pipe.

*Table IV*

| Electrode: | Streaming current, amperes (multiplied by $10^7$) |
|---|---|
| A. None | +5.0 |
| 1 grounded pin | −0.5 |
| 2 grounded pins, opposed 3 mm. apart | +2.0 |
| B. None | −3.7 |
| In filter case | −3.6 |
| None | −3.0 |
| ½" in exit pipe | −2.5 |
| ¼" downstream of pipe | −1.2 |
| 2¼" downstream of pipe | −0.1 |

Without being limited or restricted by theoretical discussion or explanation and referring to the data of Table IV–A, it may be seen that a neutralizing space charge probably develops around the point of a single electrode, but that if a second electrode of the same polarity is nearby, space charge formation is probably greatly restricted since charges of the same polarity repel each other. The data of Table IV–B can be explained similarly, that little space charge will develop around the point of an electrode if the latter is enclosed in a small metal vessel or pipe that is at the same potential.

Examples III and IV show that the grounded pointed electrode should not be too close to other metal objects if maximum neutralization is to be achieved. On the other hand, it can be seen that the required isolation for good neutralization is not very great and can easily be provided.

*Example V*

Platinum wires of three different diameters were used as grounded neutralizing electrodes in the equipment of Example III–B. The liquid was JP-4 jet fuel having a conductivity of $2.4 \times 10^{-13}$ mho/cm. The wire was disposed axially at the centerline, one end pointing upstream 12" from the filter, the other end being connected to a ground wire and covered with insulation so that it could not contact the JP-4 fuel. In one set of experiments, the length of the pointed wire was held constant and the diameter was varied from 0.016" to 0.032", the pointed end of the wire being exposed to the charged JP-4 fuel. In another set of experiments, the diameter was held constant and the length was varied, both ends of the wire being covered and no points being exposed. The results are shown in Table V.

*Table V*

| Electrode | Electrode Points Exposed | Tank Current Amperes (Multiplied by $10^7$) |
|---|---|---|
| A. None | | −0.70 |
| Pt wire, 1.5″ long: | | |
| 0.016″ diameter | One | +0.82 |
| 0.024″ diameter | do | +0.85 |
| 0.032″ diameter | do | +0.85 |
| B. None | | −1.1 |
| Pt wire, 0.024″ diameter: | | |
| 0.75″ long | None | −1.1 |
| 1.50″ long | do | −1.1 |

The data in Table V show that the convex side surface of the platinum wire is ineffective for neutralization over the range studied, and that a point is essential. It will be recalled that Example I showed that the concave surface of a pipe is ineffective in comparison with a pointed electrode.

EXAMPLE VI

Neutralization of charged liquids by grounded pointed electrodes is in some cases so effective that the liquid is "over-neutralized," i.e., the liquid acquires a charge which is opposite to its original charge. This is illustrated by some of the data shown in Examples I–V. In such cases, over-neutralization can be prevented by inserting a resistance of the proper value between the electrode and ground. A No. 2 heating oil similar to that used in Example I and the same equipment and set up as in Example I were employed. The data were obtained in the same manner as described in Example I and as shown in Table VI.

*Table VI*

Added resistance (ohms),        Tank current amperes
electrode to ground:            (multiplied by $10^7$)
No connection to ground _____ +3.2
$1 \times 10^{12}$ _____ +0.1
$1 \times 10^7$ _____ −1.0

It is obvious that a resistance slightly less than $1 \times 10^{12}$ ohms between the electrode will give exact neutralization. With other systems the optimum value of the resistance may be somewhat different, but can easily be determined by simple experimentation with varying resistances.

EXAMPLE VII

A series of experiments was carried out using wires of various metals as grounded pointed electrodes for neutralizing charged JP-4 jet fuel. The system described in Example I was used, the point of the electrode being pushed through the polyethylene filter exit pipe to the centerline. In each case the point was sharpened by hand with fine emery cloth. The results are shown in Table VII.

*Table VII*

Electrode:                     Tank current amperes
                               (multiplied by $10^7$)
None _____ +1.43
Nichrome _____ +0.23
Nickel _____ +0.15 to −0.10
Tungsten _____ +0.13
Piano wire _____ +0.19
Aluminum _____ +0.16
Bronze _____ +0.09
Silver solder _____ +0.10
Brass _____ +0.20 to −0.12

From the data in Table VII it can be seen that many different electrically conducting metals are operable in the invention. Good results have been obtained with pointed electrodes that have been made by cutting wire with ordinary wire cutters, by sharpening the points with fine emery cloth and with unused osmium-tipped phonograph needles.

EXAMPLE VIII

A JP-4 jet fuel having a specific conductivity of $3.1 \times 10^{-13}$ mho/cm. was filtered by pumping it through a commercial type filter unit at a flow rate of 17 g.p.m. The receiver was a 55-gallon drum which was insulated both from ground and from the filter, the insulation between the drum and the filter being a section of polymethylmethacrylate pipe, ¾″ i.d. x 18″. The streaming current entering the drum was measured both with and without a neutralizing grounded pointed electrode. The electrode was a common steel sewing needle, which was inserted through the wall of the polymethacrylate (Lucite) pipe so that the point of the needle was at the centerline in the JP-4 jet fuel stream. With no electrode the streaming current entering the drum was $1.2 \times 10^{-7}$ amperes. With the grounded pointed electrode in use, the current was substantially zero. Good results have also been obtained when the insulating pipe was composed of polytetrafluoroethylene (Teflon), and of ordinary laboratory plastic tubing.

EXAMPLE IX

In a full-scale test of the invention, a 5000-gallon aviation truck refueler was used to refuel the No. 5 fuselage fuel tank from a Canadian CF-100 Avro jet fighter plane. The tank, while in military use, had previously been involved in 7 explosions as a result of static charge accumulation. 250 gallons of JP-4 jet fuel having a specific conductivity of $1 \times 10^{-12}$ mho/cm. was pumped from the truck into the tank using a 30 ft. length of 2.5″ I.D. hose at a flow rate of 138 gal. per minute. The fighter plane tank was insulated by a 3″ I.D. by 10″ Teflon pipe positioned between the previously mentioned hose and its nozzle at the tank and by ⅜″ Lucite plates between the fighter tank and the ground. In three duplicate runs, no electrode was placed in the Teflon pipe while in the fourth run a 16-mesh stainless steel screen 2.5″ x 30″ was wound into a spiral, inserted in the Teflon pipe, and grounded. The screen had been cut with tin snips, the wire ends acting as pointed electrodes. There were approximately 1000 of these points which could contact the JP-4 jet fuel as it was pumped from the refueler truck into the tank.

The following results were obtained.

| Run | Electrode | Jet Fighter Tank Current Amperes (Multiplied by $10^8$) |
|---|---|---|
| 1 | None | 3.0 |
| 2 | do | 3.8 |
| 3 | do | 5.7 |
| 4 | Multi-pointed electrode | 1.5 |

From the above data it will be seen that the electrostatic charge introduced into the tank was from 50 to 70% less when the series of pointed electrodes were employed than where such electrodes were not employed.

EXAMPLE X

In another full-scale test, a platinum wire 0.016″ x 2″ was used as a grounded neutralizing electrode in refueling the No. 5 fuselage tank of a CF-100 jet fighter with JP-4 fuel as described in Example IX. The wire was suspended axially at the middle and at the centerline of the 3″ Teflon (du Pont) insulating pipe, one point pointing upstream and the other downstream. The electrode was then removed and the tank was refueled again. The following results were obtained:

Electrode:                      Jet fighter tank current
                                amperes (multiplied by $10^8$)
Pt wire _____ +3.4
None _____ +7.6

The curent into the tank was more than 40% less when the two-pointed platinum wire electrode was used.

Having now thus fully described and illustrated the character of the invention, what is desired to be secured by the Letters Patent is:

What is claimed is:

1. The method of handling flammable liquids of the type which form explosive mixtures with air while enclosed in storage vessels, flow lines and the like, and which tend to develop dangerously high electrostatic charges in flowing through zones of moving agitation such as pumps, filters and the like, said method comprising subjecting said statically charged liquids to contact with at least one pointed electrically conductive grounded electrode, said statically charged liquid being confined by electrically non-conductive material while in contact with said electrode.

2. A process of reducing electrostatic charges in flammable liquid hydrocarbons of relatively low volatility such as permits formation of explosive mixtures with ambient atmosphere in enclosed storage, which hydrocarbons have an electrical conductivity of between about $1 \times 10^{-15}$ and about $1 \times 10^{-16}$ mho/cm. which comprises subjecting said statically charged hydrocarbons to contact with at least one pointed electrically conductive grounded electrode, said statically charged hydrocarbons being confined by electrically non-conductive material while in contact with said electrode.

References Cited in the file of this patent

UNITED STATES PATENTS

| | | |
|---|---|---|
| 1,223,864 | French | Apr. 24, 1917 |
| 1,988,816 | Smith | Jan. 22, 1935 |
| 2,103,758 | Seyfried | Dec. 28, 1937 |
| 2,153,199 | Miller | Apr. 4, 1939 |
| 2,647,223 | Check | July 28, 1953 |
| 2,656,508 | Coulter | Oct. 20, 1953 |
| 2,709,871 | Douty | May 31, 1955 |
| 2,811,674 | Smith | Oct. 29, 1957 |